(12) United States Patent
Button et al.

(10) Patent No.: US 11,785,953 B2
(45) Date of Patent: Oct. 17, 2023

(54) SYSTEM AND METHOD FOR COATING FOOD PRODUCT

(71) Applicant: General Mills, Inc., Minneapolis, MN (US)

(72) Inventors: Bruce J Button, Minneapolis, MN (US); Jennifer E Folstad, Blaine, MN (US); Ivan Hajovy, Big Lake, MN (US); Constance M Lindman, Blaine, MN (US); Anthony Reuter, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 1188 days.

(21) Appl. No.: 15/980,845

(22) Filed: May 16, 2018

(65) Prior Publication Data

US 2018/0343876 A1  Dec. 6, 2018

Related U.S. Application Data

(60) Provisional application No. 62/514,477, filed on Jun. 2, 2017.

(51) Int. Cl.
| | |
|---|---|
| *A21D 13/22* | (2017.01) |
| *A21D 13/30* | (2017.01) |
| *A21D 13/28* | (2017.01) |
| *A21C 9/04* | (2006.01) |

(52) U.S. Cl.
CPC ............... *A21D 13/22* (2017.01); *A21C 9/04* (2013.01); *A21D 13/28* (2017.01); *A21D 13/30* (2017.01)

(58) Field of Classification Search
CPC .......... A21D 13/28; A21D 13/22; A21D 13/30
See application file for complete search history.

(56) References Cited

U.S. PATENT DOCUMENTS

| | | | |
|---|---|---|---|
| 3,250,625 A * | 5/1966 | Thelen | A21D 8/047 |
| | | | 426/103 |
| 5,093,146 A | 3/1992 | Calandro et al. | |
| 6,444,245 B1 | 9/2002 | Burger | |
| 7,592,026 B2 * | 9/2009 | Hartmann | A21C 11/163 |
| | | | 426/283 |
| 8,043,640 B2 | 10/2011 | Hutchinson et al. | |
| 2008/0317907 A1 * | 12/2008 | Thomas | A23P 20/15 |
| | | | 426/93 |
| 2009/0047391 A1 | 2/2009 | Stolz et al. | |
| 2009/0098256 A1 | 4/2009 | Stevens et al. | |
| 2010/0112141 A1 | 5/2010 | Panaioli et al. | |
| 2013/0295255 A1 * | 11/2013 | Tavangaran | A21B 5/08 |
| | | | 426/439 |
| 2016/0295872 A1 * | 10/2016 | Velez Argumedo | A23G 3/343 |

* cited by examiner

*Primary Examiner* — Felicia C Turner
(74) *Attorney, Agent, or Firm* — Diederiks & Whitelaw, PLC; Annette M. Frawley, Esq.; Rachel A. Kahler

(57) ABSTRACT

A food product is coated by applying a first coating to an exterior of the food product with a first depositor. Next, the food product is located in a dough proofer. Then, a second coating is applied to the exterior of the food product with a second depositor. Afterwards, the food product is baked in an oven. Optionally, prior to applying the first coating, a tacking agent is applied to the exterior of the food product with a third depositor. In a preferred embodiment, multiple coatings of a combination sugar and cinnamon are applied to filled dough products.

14 Claims, 1 Drawing Sheet

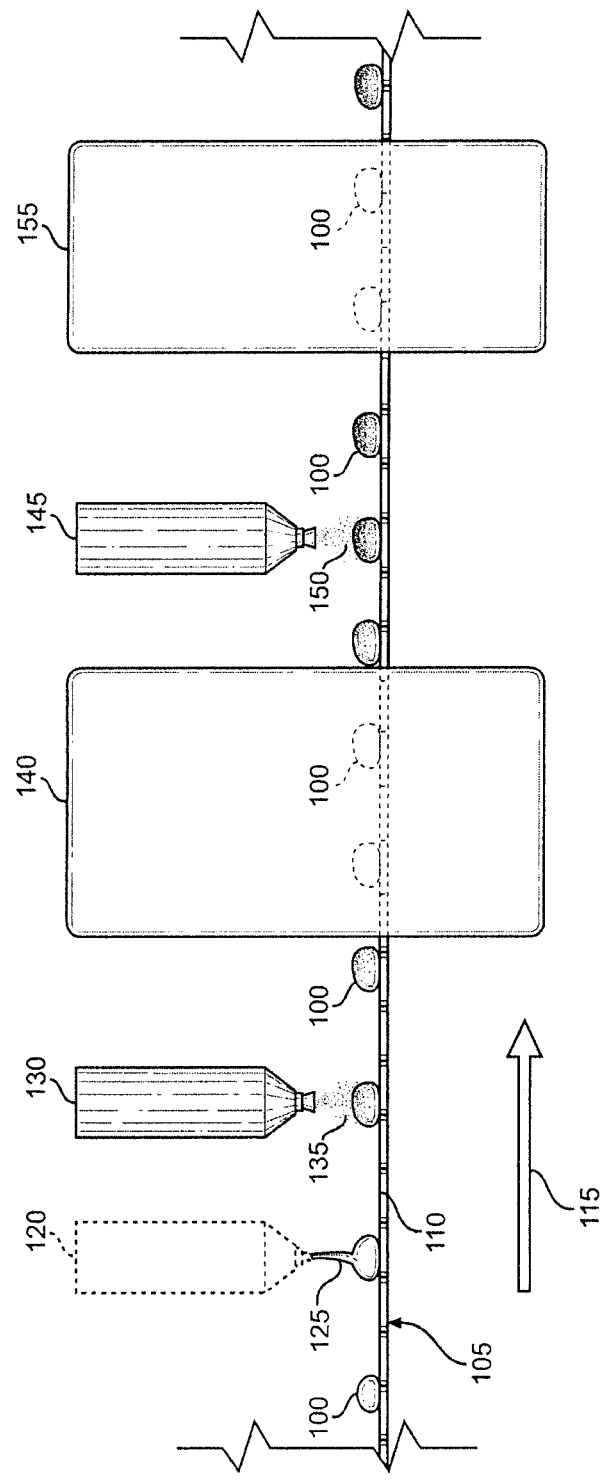

SYSTEM AND METHOD FOR COATING FOOD PRODUCT

CROSS-REFERENCE TO RELATED APPLICATIONS

This application claims the benefit of U.S. Provisional Patent Application Ser. No. 62/514,477 filed Jun. 2, 2017 entitled "System and Method for Coating Food Product". The entire contents of this application are incorporated herein by reference.

BACKGROUND OF THE INVENTION

The present invention pertains to coated food products and, more particularly, to increasing the amount of coating that adheres or sticks to food products during coating while also ensuring that the coating remains adhered to the food products.

Coatings are often applied to food products. In general, such coatings can be applied in solid form (e.g., salt crystals, an Italian seasoning blend or a mixture of cinnamon and sugar particles), in liquid form (e.g., melted butter, a glaze or a frosting) or as a mixture of both (e.g., a frosting including sprinkles). Depending on the nature of the coating and food product, it can be difficult to ensure that a desired amount of coating actually sticks to a food product during application of the coating. Also, even if the coating initially sticks to the food product, some of the coating can fall off during subsequent production steps. For example, some of the coating might fall off during a cooking, packaging or transportation step.

To solve these problems, some food products are sold uncoated but packaged with a separate coating that can be applied just before the food products are eaten. This arrangement is not preferred since it requires additional work on the part of a consumer and relies on the consumer to evenly coat the food products to get the full sensory experience. Evenly coating the food products can be especially difficult for the consumer if the food products are not all eaten at the same time. Also, in such a situation, the consumer must repackage the coating for later use, further increasing the work required of the consumer or necessitating the provision of resealable packaging for the coating.

In view of the above, there is a need in the art to improve the coating of food products by increasing the amount of coating, at least some of which is in particulate form, that sticks to the food products during the coating step and ensuring that the coating remains stuck to the food products.

SUMMARY OF THE INVENTION

The present invention is directed to a system and method for coating a food product. A first coating is applied to an exterior of the food product with a first depositor. After applying the first coating, the food product is delivered to a proofer. Next, a second coating is applied to the exterior of the food product with a second depositor. After applying the second coating, the food product is baked in an oven. Optionally, prior to applying the first coating, a tacking agent is applied to the exterior of the food product with a third depositor. In one embodiment, the tacking agent is an oil, a corn syrup, a brine or a liquid cheese.

The food product contains dough, and the dough includes a chemical leavening system. Alternatively, the dough is unleavened. Optionally, the dough also includes a filling. The filling can include a cheese, fruit, vegetable, chocolate, peanut butter or gravy.

Preferably, the first coating contains sugar, and the sugar is at least partially melted when the food product is located in the dough proofer. In one embodiment, the dough proofer is at a temperature of at least about 72° F. and a relative humidity of about 72%.

In some embodiments, the first and second coatings are particulate coatings. In other embodiments, the first and second coatings are liquid coatings. In one embodiment, the first and second coatings are cinnamon sugar coatings. Preferably, the first and second coatings are identical.

A conveyor system is configured to transport the food product through or under the optional tacking agent depositor and then the first coating depositor, dough proofer, second coating depositor and oven.

Additional objects, features and advantages of the invention will become more readily apparent from the following detailed description of preferred embodiments thereof when taken in conjunction with the drawings wherein like reference numerals refer to common parts in the several views.

BRIEF DESCRIPTION OF THE DRAWINGS

FIG. 1 is a schematic view of the machinery involved in the coating methods of the present invention.

DETAILED DESCRIPTION OF THE INVENTION

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. In addition, any specific numerical value listed herein includes a margin of error of +/−5%. Accordingly, a temperature of 100° F. includes temperatures between 95 and 105° F. Similarly, a range of 80-120° F. includes temperatures between 76 and 126° F. The term "about" increases the margin of error to 10%. For numerical values expressed as percentages, the margin of error refers to the base numerical value. In other words, "about 20%" means 18-22% and not 10-30%.

As discussed above, when producing a coated food product, it can be difficult to ensure that a desired amount of coating actually adheres or sticks to the food product during application of the coating. Also, even if the coating initially adheres to the food product, some of the coating can fall off during subsequent production steps. The present invention provides a coating method that addresses these problems. Specifically, the present invention is directed to coating dough-based food products with solid or liquid coatings. A solid coating generally means a particulate coating, e.g., salt crystals or a mixture of granulated sugar and ground cinnamon. Glazes, frostings and melted butter represent typical liquid coatings. Of course, it should be recognized that a variety of different coatings, both sweet and savory, can be used in the present invention. For purposes of the present invention, a liquid coating including suspended solid particles (e.g., a frosting with sprinkles) is considered a liquid coating.

The process of the present invention involves five main steps when a solid coating is used and four main steps when a liquid coating is used, although many more steps are involved in the overall production process. In the first step for a solid coating, a tacking agent is applied to an exterior of a dough-based food product. Specifically, the tacking agent is directly applied to the dough. In one embodiment, the tacking agent is an oil. More broadly, the tacking agent is a liquid that will not dissolve the subsequently applied solid coating. Instead, the tacking agent helps the solid coating stick to the dough when the solid coating is applied in the second step. That is, the tacking agent increases the amount of the solid coating that sticks to the dough as compared with applying the solid coating to the dough in the absence of the tacking agent.

In the third step, the food product is placed in a dough proofer (e.g., a proofing oven). Importantly, this proofing step is performed regardless of whether the dough actually requires proofing. For example, the proofing step is performed even with chemically-leavened or unleavened dough. The reason for this is that the benefit provided by the dough proofer relates to the heat and humidity found within the dough proofer. Specifically, the heat and humidity help with the fourth step in which an additional solid coating is applied to the dough. The heat and humidity increase the amount of the additional solid coating that sticks to the dough as compared with applying the additional solid coating without performing the proofing step. Although not to be bound by the theory, it is considered that the heat and humidity advantageously accomplish this by at least partially melting the solid coating applied in the second step such that the additional solid coating applied in the fourth step increasingly sticks to the solid coating applied in the second step. This is especially effective when the solid coating of the second step contains sugar due to the stickiness provided by the sugar. Still, the additional weight of the water established on the surface of the pieces, which can vary based on various factors including the size and shape of a given piece and proof box operational parameters, enhances the adherence of the coating.

After the additional solid coating is applied, the food product is baked in the fifth step. Although further production steps are contemplated, e.g., packaging, these steps are not the focus of the present invention and will not be discussed in detail. Similarly, it should be recognized that a variety of steps are performed to produce the food product involved in the first step. Again, such steps are not the focus of the present invention, and they will not be discussed in detail.

As noted above, the process of the present invention involves four main steps when a liquid coating is used. These steps correspond to steps two through five of the process used with a solid coating. That is, no tacking agent is used, but corresponding other steps remain the same. Specifically, in the first step, a dough-based food product is coated with a liquid coating and, in the second step, the food product is placed in a dough proofer. Afterwards, additional liquid coating is applied to the food product in the third step, and the food product is baked in the fourth step. A tacking agent is not used since the liquid coating more readily sticks to the food product than a dry coating would even during the first of the two coating steps. However, the proofing step is still specifically performed and beneficial in helping the additional liquid coating of the third step stick to the liquid coating of the first step.

It has been found that the coating methods outlined above significantly increase the amount of coating which sticks to dough-based food products and ensure that the coating remains stuck to the food products. Accordingly, the food products can be sold coated and do not need to be packaged with a separate coating that is applied just before the food products are eaten.

FIG. 1 provides a schematic overview of the general system components involved in the coating methods of the present invention. Specifically, FIG. 1 shows a plurality of dough-based food products 100 being transported by a conveyor system 105. In the embodiment illustrated, conveyor system 105 includes an open mesh conveyor belt 110 on which food products 100 are supported. However, other conveyor systems known in the art can be used with the present invention. Preferably, food products 100 are filled dough products, i.e., each food product 100 comprises a shaped dough having a filling. Such fillings can include cheese (e.g., cream cheese), fruit, vegetables, chocolate, peanut butter, gravy and mixtures thereof, for example. Alternatively, food products 100 can omit the filling. In either case, food products 100 can be savory or sweet, as desired. Preferably, food products 100 are chemically leavened, i.e., each food product 100 employs a chemical leavening system. However, the present invention also works when food products 100 are yeast leavened or unleavened (i.e., when food products 100 do not contain yeast or a chemical leavening system).

Food products 100 are transported by conveyor system 105 in a direction 115 such that, when a depositor 120 is used, a given food product 100 first passes under or through depositor 120. Depositor 120 is configured to apply a tacking agent 125 to the exteriors of food products 100. Accordingly, as discussed above, depositor 120 is used when a solid coating is being applied to food products 100 but not when a liquid coating is being applied to food products 100. Tacking agent 125 helps the solid coating stick to food products 100, particularly by moistening the exteriors of food products 100. Broadly, tacking agent 125 can be any edible substance that is liquid at application temperature (i.e., the temperature at which tacking agent 125 is applied to food products 100). Preferably, tacking agent 125 is a liquid that will not dissolve the solid coating being applied to food products 100. In one embodiment, tacking agent 125 is an oil, such as vegetable oil. However, other liquid tacking agents can be used (e.g., a corn syrup, brine or liquid cheese). If desired, tacking agent 125 can include a flavoring agent.

Next, food products 100 pass under or through a depositor 130, which is configured to apply a first coating 135 to the exteriors of food products 100. First coating 135 can be a solid coating or a liquid coating and can be sweet or savory. In one embodiment, first coating 135 is a cinnamon sugar coating (i.e., a mixture of granulated sugar and ground cinnamon) applied by directing dough food products 100 through a dispensed vertical curtain of the particulates. In another embodiment, first coating 135 is a glaze or frosting. Other coatings suitable for use as first coating 135 include, by way of example only, butter, herbs, spices, salt and mixtures thereof.

Food products 100 are then transported through a dough proofer 140 (e.g., a proofing oven). Food products 100 pass through dough proofer 140 regardless of whether food products 100 actually require proofing. In other words, this "proofing" step is performed even when the dough of food products 100 is chemically leavened or unleavened. The reason for this is that, as indicated above, the benefit provided by dough proofer 140 relates to the heat and humidity found within dough proofer 140. Specifically, the heat and humidity has been found too significantly increase the amount of a second coating 150 that sticks to food products 100 by at least partially melting first coating 135 such that second coating 150 sticks to first coating 135 when second coating 150 is applied to food products 100 by a depositor 145. This is especially effective when first coating 135 contains sugar due to the stickiness provided by the sugar. To provide the desired heat and humidity, the interior of dough proofer 140 preferably has a temperature of at least about 72° F. (22° C.) and a relative humidity of about 72%. However, it should be understood that these values vary depending on the amount of time food products 100 spend in dough proofer 140.

Like depositor 130, depositor 145 is configured to apply second coating 150 to the exteriors of food products 100 when food products 100 pass under or through depositor 145. Preferably, second coating 150 is identical to first coating 135. However, this need not be the case. For example, second coating 150 can be the same type of coating as first coating 135 but with a different ratio of ingredients, e.g., first coating 135 and second coating 150 can be different cinnamon sugar coatings. Alternatively, first coating 135 and second coating 150 can be distinct types of coatings, e.g., separate cinnamon and sugar coatings.

After second coating 150 is applied, food products 100 are baked in an oven 155, which, like dough proofer 140, helps coatings 135 and 150 better stick to food products 100. While further production steps would typically occur after baking, e.g., packaging, these steps are not the focus of the present invention and are therefore not shown. Similarly, it should be recognized that a variety of steps are performed to prepare food products 100 before food products 100 are coated with tacking agent 125 or first coating 135. Again, such steps are not the focus of the present invention and are not shown.

Based on the above, it should be readily apparent that the present invention improves the retention of coating food products by increasing the amount of coating that sticks to the food products during a coating step and ensuring that the coating remains stuck to the food products. When particulate coatings are employed, small sized particulates at or near powder form are most desirable to enhance the coating coverage. While certain preferred embodiments of the present invention have been set forth, it should be understood that various changes or modifications could be made without departing from the spirit of the present invention. In general, the invention is only intended to be limited by the scope of the following claims.

The invention claimed is:

1. A method of coating a food product, the method comprising:
    applying a first coating to an exterior of the food product, wherein applying the first coating to the food product includes applying a particulate coating to the food product;
    after applying the first coating to the food product, locating the food product in a dough proofer;
    after locating the food product in the dough proofer, applying a second coating to the exterior of the food product, wherein applying the second coating to the food product includes applying a particulate coating to the food product; and
    after applying the second coating to the food product, baking the food product.

2. The method of claim 1, further comprising, prior to applying the first coating to the food product, applying a tacking agent to the exterior of the food product.

3. The method of claim 2, wherein applying the tacking agent to the food product includes applying an oil, a corn syrup, a brine or a liquid cheese to the food product.

4. The method of claim 1, wherein the food product contains dough.

5. The method of claim 4, wherein the dough includes a chemical leavening system.

6. The method of claim 4, wherein the dough is unleavened.

7. The method of claim 4, wherein the dough includes a filling.

8. The method of claim 7, wherein the filling includes a cheese, fruit, vegetable, chocolate, peanut butter or gravy.

9. The method of claim 1, wherein applying the first coating to the food product includes applying sugar to the food product.

10. The method of claim 1, wherein locating the food product in the dough proofer includes locating the food product in the dough proofer, wherein the interior of the dough proofer has a temperature of at least about 72° F.

11. The method of claim 10, wherein locating the food product in the dough proofer includes locating the food product in the dough proofer at a relative humidity of about 72%.

12. The method of claim 1, wherein locating the food product in the dough proofer includes locating the food product in a proofing oven.

13. The method of claim 1, wherein the first coating is identical to the second coating.

14. The method of claim 1, wherein:
    applying the first coating to the food product includes applying a cinnamon sugar coating to the food product; and
    applying the second coating to the food product includes applying a cinnamon sugar coating to the food product.

* * * * *